| United States Patent [19] | [11] Patent Number: 4,477,635 |
| Mitra | [45] Date of Patent: Oct. 16, 1984 |

[54] POLYMERIC TRIARYLMETHANE DYES

[75] Inventor: Smarajit Mitra, Woodbury, Minn.

[73] Assignee: Minnesota Mining and Manufacturing Company, St. Paul, Minn.

[21] Appl. No.: 336,637

[22] Filed: Jan. 4, 1982

[51] Int. Cl.³ .................. C08G 63/08; C07C 15/16; B32B 27/00
[52] U.S. Cl. .................. 525/437; 525/462; 525/417; 525/453; 260/386; 260/389; 260/390; 260/351; 260/365; 260/369; 260/367; 260/239 BF; 260/239.3 R; 548/425; 548/536; 548/146; 548/152; 548/217; 548/333; 548/215; 548/335; 548/325; 548/373; 548/474; 548/526; 544/336; 544/224; 544/180; 544/211; 544/212; 549/23; 549/74; 546/255; 546/79; 546/243
[58] Field of Search .............. 260/386, 389, 390, 351; 260/365, 369, 367, 346.72, 347.7, 343.44, 239 BF, 239.3 R, 236, 317; 548/425, 536, 146, 152, 217, 333, 215, 335, 325

[56] References Cited

U.S. PATENT DOCUMENTS 2,816,900 12/1957 Herrick et al. .................. 260/390
4,353,833 10/1982 Bruder et al. .................. 260/386

FOREIGN PATENT DOCUMENTS 48-8562 3/1973 Japan .

OTHER PUBLICATIONS

Abrahart, *Dyes and Their Intermediates*, 1968, pp. 212-215, and 8.
Braun, D. Makromol Chemie 33, 181, (1959).

*Primary Examiner*—Richard L. Raymond
*Assistant Examiner*—Raymond Covington
*Attorney, Agent, or Firm*—Donald M. Sell; James A. Smith; Lorraine R. Sherman

[57] ABSTRACT

Polymeric and copolymeric aminotriarylmethane dyes having polyester, polyethyleneimine, or polyurethane backbones, and a process for their preparation, are disclosed. The novel dyes are highly colored and resistant to leaching by solvents.

14 Claims, No Drawings

POLYMERIC TRIARYLMETHANE DYES

DESCRIPTION

1. Field of the Invention

This invention relates to polymeric aminotriarylmethane dyes in which an amino substituent forms part of the polymer backbone. In another aspect, it relates to a process for preparing polymeric aminotriarylmethane dyes. The novel dyes are highly colored and resistant to leaching by solvents.

2. Background Art

Dyes for use in the coloring of textiles, plastics, and coating that have improved fastness towards light and solvents have been the subject of research for many years. Improved light and wash fastness has been obtained for dyes by (1) altering the dye structure to increase the physical adsorption of the dye onto the substrate, (2) providing functional groups on the dye that form covalent bonds with active sites on the substrate, or (3) changing the physical shape of the dye to provide improved mechanical retention of the dye by the substrate. An example of the latter is polymeric dyes.

The best known polymeric dyes are those obtained by the polymerization of ethylenically-substituted dye molecules. Such dyes have limited value because of the difficulty encountered in polymerizing the bulky dye monomer due to steric effects.

The difficulty of polymerizing bulky monomers has been avoided in the teachings of D. Braun, Makromol Chemie 33, 181 (1959) wherein dye polymers are prepared by the reaction of functionalized polymers with appropriate dye generating compounds, e.g., the condensation of the lithium derivative of polystyrene with a suitable ketone and the diazotization of polyaminostyrene followed by coupling with a suitable intermediate, such as Crystal Violet. These dye polymers have polyethylene backbones.

Japanese Pat. No. 7,308,562 (Chem. Abstracts 80, 38395x (1974)) discloses the preparation of condensation polymeric dyes by the treatment of anthraquinone and triphenylmethane dyes that contain two or more hydroxyl, amino, or carboxyl groups with diisocyanates, the polymers being suitable for dyeing synthetic and natural fibers. The backbones of the polymeric dyes obtained by this process are almost entirely aromatic, making these polymers essentially insoluble in all solvents.

SUMMARY OF THE INVENTION

In accordance with this invention, there is provided solvent soluble polymeric aminotriarylmethane dyes having polyester, polycarbonate, polyurethane, or polyethyleneimine backbones and a process for the production of such dyes. These polymeric dyes have excellent wash fastness. As used herein, "aminotriarylmethane" includes aminotriaromaticmethane.

The polymeric aminotriarylmethane dyes of the invention have at least one arylamino unit of the general formula:

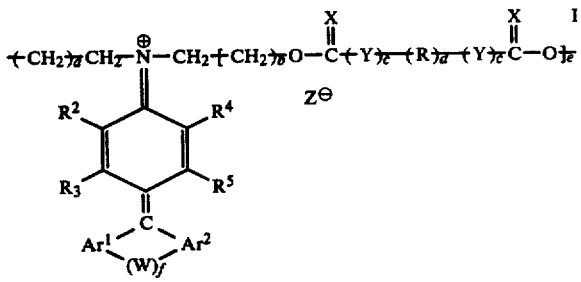

wherein
a and b are independently zero or an integer having a value of 1 to 3;
X is oxygen or sulfur;
Y is oxygen or —NH—;
R is a divalent organic group selected from (1) aliphatic groups having 2 to 12 carbon atoms and up to 2 noncontiguous catenary groups selected from —O—, —S—, and —NR$^1$—, in which R$^1$ is lower alkyl group having one to four carbon atoms, (2) cycloaliphatic groups having 5 to 12 carbon atoms, optionally having one catenary —O—, —S—, or

group therein, and (3) arylene groups having 6 to 12 carbon atoms;
c, d, and e are independently zero or one, with the provisos that when e is zero, then a is zero, and when c is zero or Y is oxygen, then X is oxygen;
R$^2$, R$^3$, R$^4$, and R$^5$ are independently hydrogen, an auxochromic group, a bathochromic group, or R$^2$ and R$^3$ or R$^4$ and R$^5$ together are a benzo group optionally substituted by auxochromic groups or bathochromic groups;
Ar$^1$ and Ar$^2$ are independently aromatic groups having one or two 5- or 6-atom rings with conjugated unsaturation, the 5-atom rings having four carbon atoms and one of oxygen, sulfur, or nitrogen or three carbon atoms, one nitrogen, and one of oxygen or sulfur in the 1,3-position or nitrogen in the 1,2-or 1,3-position, the 6-atom rings having six carbon atoms, or five carbon atoms and one nitrogen, or four carbon atoms and two nitrogens in the 1,2-, 1,3-, or 1,4-position or three carbon atoms and three nitrogens in the 1,3,5-position, each group optionally substituted by auxochromic and bathochromic groups; and
W is a divalent group selected from the group consisting of a coordinate bond, —O—, —S—,

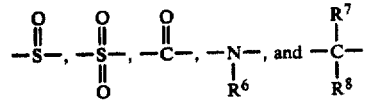

in which R$^6$ is hydrogen or a lower alkyl group having one to four carbon atoms and R$^7$ and R$^8$ are independently hydrogen or lower alkyl group having one to four carbon atoms;
f is zero or one; and
Z$^\ominus$ is an anion.

More particularly, Ar$^1$ and Ar$^2$ are independently aromatic groups selected from phenyl, furyl, thienyl, pyrryl, thiazolyl, oxazolyl, imidazolyl, pyrazolyl, pyridyl, pyrimidyl, pyrazinyl, pyridazinyl, and s-triazinyl and their benzo derivatives, each optionally substituted by auxochromic or bathochromic groups.

The polymeric aminotriarylmethane dyes of the invention can be copolymeric and contain up to 99.9 mol percent of units of a non-arylamino unit-containing polyester, polycarbonate, or polyurethane having the general formula

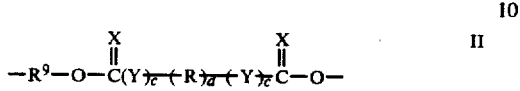
II in which $R^9$ is an alkylene group having 2 to 12 carbon atoms or polyoxyethylene, polyoxypropylene or polyoxybutylene having a molecular weight up to 3000 and X, Y, R, c, and d are the same as defined above.

The polymeric aminotriarylmethane dyes, therefore, can contain 0.1 to 100 mol percent of the arylamino unit.

Also provided herein is a process for preparing the polymeric aminotriarylmethane dyes of the present invention, the process comprising the steps:

(1) providing an N-arylamino polymer or copolymer having at least one unit of the general formula:

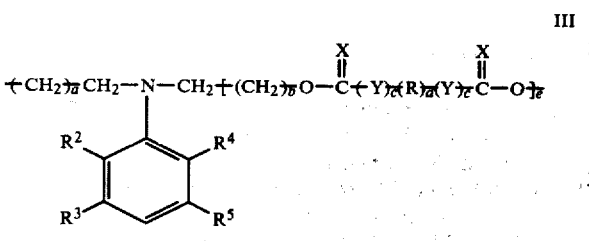
III wherein: a, b, c, d, e, X, Y, R, $R^2$, $R^3$, $R^4$, and $R^5$ are defined above;

(2) condensing the N-arylamino polymer or copolymer with a diarylketone ("diaryl" ketone includes diaromatic ketone) having the general formula:

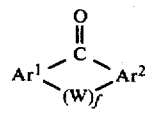
IV wherein $Ar^1$, $Ar^2$, W, and f are as defined above; and (3) isolating the polymeric dye.

DETAILED DESCRIPTION OF THE INVENTION

The polymeric aminotriarylmethane dyes of the invention are useful for imparting hue to natural and synthetic fibers and fabrics such as cotton, polyester, polyamide, rayon, and mixtures thereof.

The polymeric and copolymeric dyes of the invention have repeating units of Formula I that can contain auxochromic groups (enhance color of a chromophore or develops color from a chromogen) and bathochromic groups (organic radical which displaces the absorption spectrum of an organic molecule towards the red). These groups are well known in the field of dyestuff chemistry and are introduced into a dye molecule to influence the color of the dye. Included among such groups are halogen, alkyl such as methyl and ethyl, phenyl, chlorophenyl, nitro, carboxyl, amino, dimethylamino, diethylamino, N-benzyl-N-ethylamino, 2,4-dinitrophenylamino, bis(3-sulfatobenzyl)amino, dibenzylamino, methoxy, ethoxy, benzo, sulfatobenzo, N-methyl-anilino, acetylamido, chloroacetylamido, and 4-dimethylaminophenyl.

Suitable anions include chloride, bromide, sulfate, nitrate, phosphate and toluenesulfonate anions.

The polymeric aminotriarylmethane dyes of the present invention are prepared by condensing a precursor N-arylamino polymer (Formula III) with a diarylketone (Formula IV) in accordance with Equation I below:

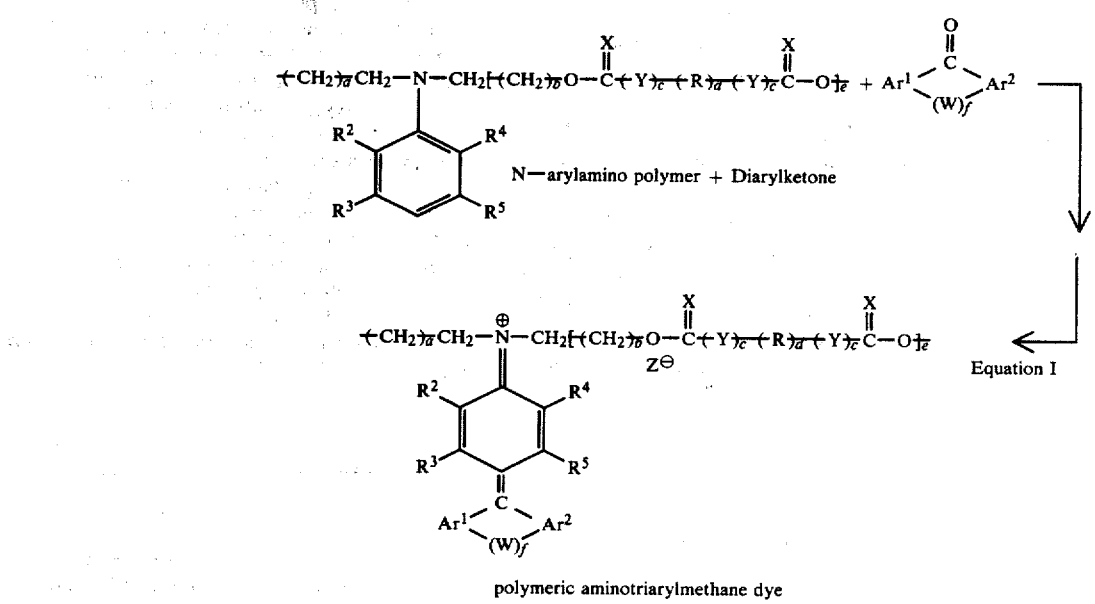

N—arylamino polymer + Diarylketone polymeric aminotriarylmethane dye

Equation I wherein a, b, c, d, e, f, X, Y, R, $R^2$, $R^3$, $R^4$, $R^5$, Z, $Ar^1$ and $Ar^2$ are the same as defined above.

Suitable precursor N-arylamino polymers and copolymers are linear polymers having at least one end up to 25 catenary amino nitrogen atoms in which the nitrogen atoms are substituted by an aryl group as is defined by

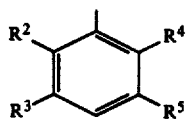

in Formula III (e.g., phenyl, naphthyl, 2,6-dimethylphenyl, or 3-methoxyphenyl) having a position para to the nitrogen occupied by hydrogen.

By the term "catenary" is meant "of the backbone" or "in the polymer chain". The term "amino nitrogen" means that only unoxidized carbon atoms (i.e. there is no carbonyl,

group) are attached to the nitrogen. The term "substituted by an aryl group having a position para to the nitrogen occupied by hydrogen" means that only hydrogen can be present on the carbon atom that is para to the carbon atom to which the nitrogen is attached.

Preferable N-arylamino polymers of Formula II for use in the polymeric aminotriarylmethane dyes of the invention are A. ethyleneimino polymers and
B. arylamino ester or urethane polymers and copolymers.

Suitable ethylenimino polymers have repeating units of the general formula:

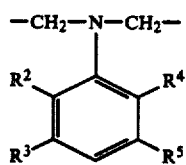   V in which: $R^2$, $R^3$, $R^4$, and $R^5$ are the same as defined for Formula I.

Suitable arylamino ester and carbonate polymers have repeating units of the general formulae:

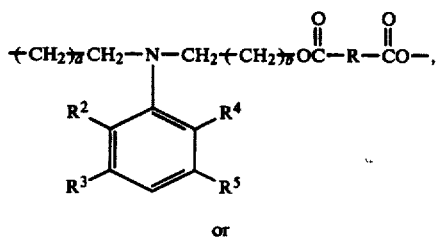   VI or

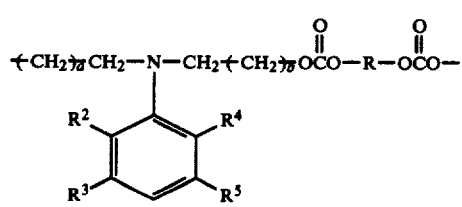   VII

Suitable arylamino urethane polymers have repeating units of the general formula:

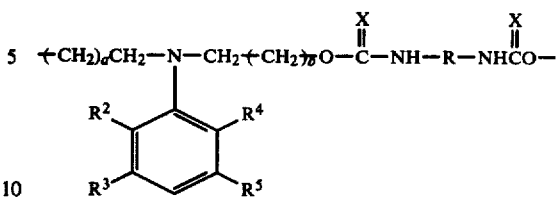   VIII

The alkyleneimino polymers having units of Formula IV are prepared by the polymerization of N-aryl-substituted aziridines as is described by Heine et al., J. American Chemical Society, 76, 1173 (1954) for the polymerization of N-phenylaziridine.

The arylamino ester polymers having units of Formula V are prepared by condensation reaction procedures well known in the art, i.e., condensation of N,N-di(hydroxyalkyl)arylamines with dicarboxylic acids, their acid halides, or their lower alkyl esters in accordance with Equation II below. (Reaction of the N,N-di(hydroxyalkyl)arylamines with corresponding anhydrides give the same polymer.)

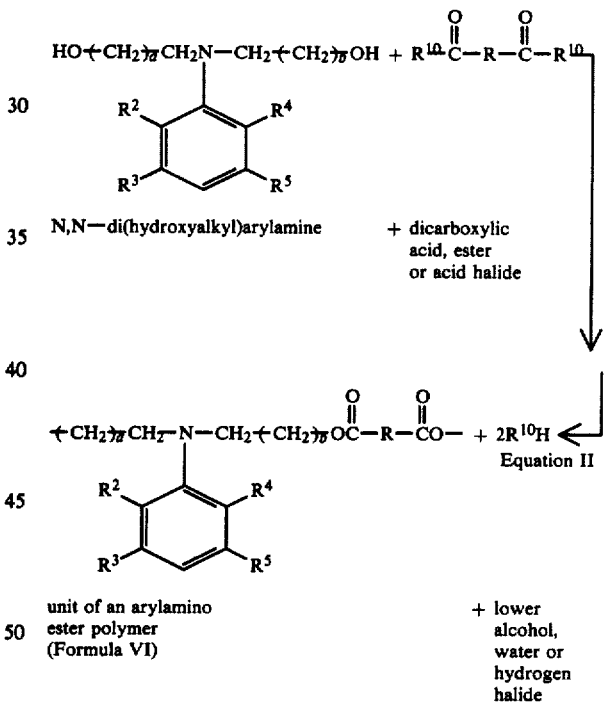

N,N—di(hydroxyalkyl)arylamine   + dicarboxylic acid, ester or acid halide unit of an arylamino ester polymer (Formula VI)   + lower alcohol, water or hydrogen halide Equation II The arylamino carbonate polymers having units of Formula VII can be prepared by the reaction of the N,N-di(hydroxyalkyl)arylamine with a bis-(halocarbonyloxy) organic compound in accordance with the Equation III below:

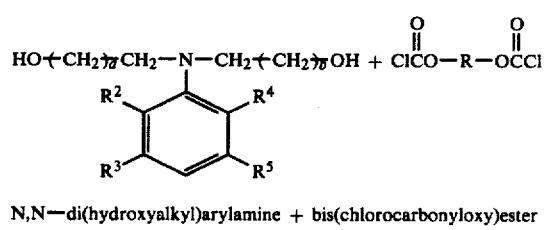

N,N—di(hydroxyalkyl)arylamine + bis(chlorocarbonyloxy)ester

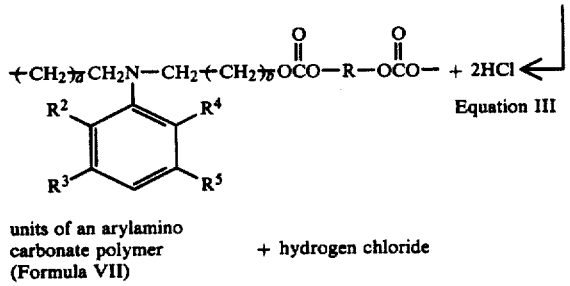

units of an arylamino
carbonate polymer      + hydrogen chloride
(Formula VII)

Equation III

The arylamino urethane polymers having units of Formula VIII can be prepared by the reaction of the N,N-di(hydroxyalkyl)arylamine with diisocyanates or diisothiocyanates in accordance with Equation IV below:

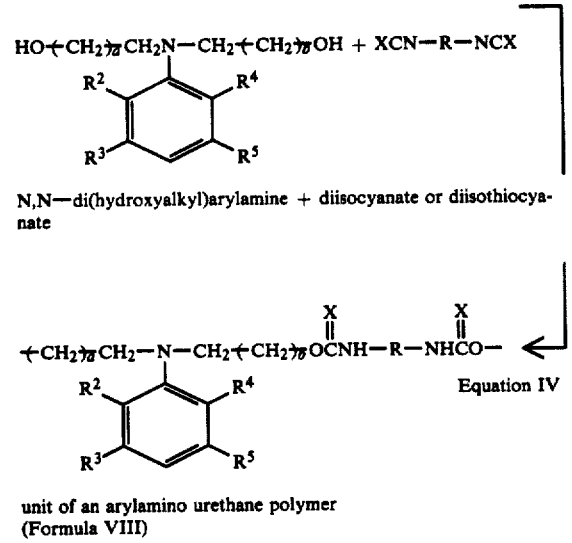

Equation IV unit of an arylamino urethane polymer
(Formula VIII)

In the above equations, a, b, X, R, $R^2$, $R^3$, $R^4$, and $R^5$ are the same as are defined above, and $R^{10}$ is halogen, hydroxyl, lower alkoxy, or lower alkoxyalkoxy having one to four carbon atoms.

In the above described N-arylamino ester, carbonate, and urethane polymers, up to 99.9 mole percent of the N,N-di(hydroxyalkyl)arylamine can be replaced by monomeric diols or polymeric diols to give copolymers having 0.1 to 100 mole percent of the N,N-di(hydroxyalkyl)arylamine and at least one unit of the general formulas shown in Formulas VI, VII, and VIII.

Suitable N-arylethyleneimines, also named N-arylaziridines, include N-phenylaziridine, N-(3-methylphenyl)aziridine, N-(2,3,-dimethylphenyl)aziridine, N-(1-naphthyl)aziridine, N-(3-methoxyphenyl)aziridine, N-(3-chlorophenyl)aziridine, N-(3,5-dichlorophenyl)aziridine, N-(2-nitrophenyl)aziridine, and N-(2-dimethylaminophenyl)aziridine.

Suitable N,N-dialkanolarylamines for use in the preparation of the arylamino polymers of Formulas VI, VII, and VIII include N,N-dimethanolaniline (also named, N,N-di(hydroxymethyl)aniline), N,N-diethanolaniline (also named, N,N-di(2-hydroxyethyl)aniline), N,N-di(3-hydroxypropyl)aniline, N,N-di(2-hydroxyethyl)-2-methoxyaniline, N,N-di-(2-hydroxyethyl)-3-methylaniline, N,N-di(2-hydroxyethyl)-2,3-dimethylaniline, N,N-di(2-hydroxyethyl)3-diethylaminoaniline, N,N-di(2-hydroxyethyl)-3-[(bissulfatobenzyl)amino]aniline, N-(2-hydroxyethyl)-N-(3-hydroxypropyl)-1-naphthylamine and the like.

Suitable dicarboxylic acids include oxalic, succinic, glutaric, adipic, trimethyladipic, pimelic, suberic, 1,2-cyclohexanedicarboxylic, 1,3-cyclohexanedicarboxylic, 1,4-cyclohexanedicarboxylic, phthalic, isophthalic, terephthalic, 2,4-naphthalenedicarboxylic, 2,6-naphthalenedicarboxylic, diphenic, diglycolic, 3,3'-thiodipropionic, methyliminodiacetic, 4,4'-oxydibenzoic, 3,3'-sulfonyldibenzoic, 2,2'-benzophenonedicarboxylic acids and the like dicarboxylic acids and their corresponding acid anhydrides, chlorides and lower alkyl esters such as methyl, ethyl, propyl and methoxyethyl esters. Also suitable are the corresponding bisthiocarboxylic acids such as 1,2-ethanebis(thioic 0-acid), 1,4-butanebis(thioic 0-acid), 1,4-benzene-bis(thioic 0-acid). (Note: these thioacids are not presently in the scientific literature but, as may be reasonably expected by those skilled in the art, they will be useful in the present invention).

Suitable diisocyanates and diisothiocyanates that can be used in the preparation of arylaminourethanepolymers of Formula VIII are any of the organic diisocyanates and diisothiocyanates known in urethane art including, for example, the diisocyanates listed in U.S. Pat. No. 4,048,253. Preferred diisocyanates are diphenylmethane-4,4'-diisocyanate, diphenylether-4,4'-diisocyanate, 1,4-benzenediisocyanate, toluenediisocyanate, 1,6-hexanediisocyanate, 1,4-cyclohexanediisocyanate, 1,5-naphthalenediisocyanate, dicyclohexylmethane-4,4'-diisocyanate, and isophoronediisocyanate. Suitable also are the corresponding diisothiocyanates such as toluenediisothiocyanate, 1,6-hexanediisothiocyanate, and 1,4-cyclohexanediisothiocyanate.

Suitable bis(halocarbonyloxy) organic compounds for use in reaction with the N,N-di(hydroxyalkyl)arylamines for preparation of arylamino carbonate polymer precursor of the polymeric dyes of the invention are themselves the reaction product of an organic diol with two equivalents of phosgene in accordance with Equation V:

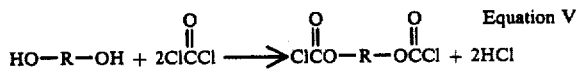

Equation V wherein R is as defined above.

Generally the reaction is performed by the slow addition of phosgene to an organic diol in a suitable solvent such as chloroform at a temperature of 0° to 50° C., absorbing the evolved hydrogen chloride, and isolating the bis(chlorocarbonyloxy) organic compound in accordance with procedures well known in organic chemistry. Suitable diols for use in the reaction can be any liquid or solid organic material having a hydroxyl functionality of two, and is free of other "active hydrogens" and groups which may be thermally or photolytically unstable, i.e., those that decompose at temperatures below about 100° C. or in the presence of actinic radiation or electron beams. The term "active hydrogen" is well known and commonly used in the art, signifying active hydrogen as determined by the method of Zerewitinoff, J. Am. Chem. Soc., 49, 3181(1927). Preferably, the organic material contains two primary or secondary hydroxyl groups bonded directly to nonaromatic carbon. The diol can be monomeric and have a molecular weight as low as 62 or it can be polymeric, e.g., have repeating units and have a molecular weight as high as 3000. Higher molecular weights tend to reduce reaction rates and decrease the intensity of the color of the resultant dyes.

Representative examples of useful monomeric diols suitable for use in the precursor arylamino carbonate polymers and in the carbonate, polyester, and polyurethane copolymers of the polymeric aminotriarylmethane dyes of the invention include alkylene glycols such as 1,2-ethanediol, 1,3-propanediol, 1,4-butanediol, 1,3-cyclopentanediol, 1,4-cyclohexanediol, 2-ethyl-1,6-hexanediol, 1,4-bis(hydroxymethyl)cyclohexane, 1,4-benezenedimethanol, 3-chloro-1,2-propanediol, 2-(2-hydroxyethoxy)ethanol, 2-[2-(hydroxyethoxy)ethoxy]ethanol, 2-(2-hydroxyethylthio)ethanol, and 2,2'-(N-methyl)iminodiethanol.

Representative examples of useful polymeric diols suitable for use in the precursor arylamino carbonate polymers and carbonate, polyester, and polyurethane copolymers are the polyoxyalkylene glycols having alkylene units of 2 to 4 carbon atoms and molecular weights up to 3000 such as the polyoxyethylene glycols, the polyoxypropylene glycols, and the polyoxytetramethylene glycols.

Representative examples of suitable diarylketones (Formula III) for use in preparing the polymeric aminotriarylmethane dyes of the invention in accordance with Equation I include: benzophenone and diaryl ketones substituted by one to four inert auxochromic or bathochromic groups such as 4-dimethylaminobenzophenone, 4-biphenyl phenyl ketone, 4,4'-bis(dimethylamino)benzophenone, 4-methylphenyl phenyl ketone, bis(4-methylphenyl) ketone, bis(2-naphthyl) ketone, 2,4-dimethylphenyl phenyl ketone, 4-chlorophenyl phenyl ketone, and 4-methoxyphenyl phenyl ketone and heterocyclic ketones such as 2-benzoylfuran, 2-benzoylcoumarone, 2-benzoylpyrrole, 2-benzoylindole, 2-(4-dimethyl-aminobenzoyl)indole, bis(3-indolyl) ketone, 2-methyl-3-benzoylindole, 3-benzoylthiophene, 2-benzoylthionaphthen, 2-benzoylbenzthiazole, 2-benzoyl-3-phenylbenzthiazole, 2-(3-methoxy-benzoyl)-3-phenylbenzoxazole, 2-(4-dimethyl-aminobenzoyl)-3-phenyl-4-chlorindole, 4-[4-(N-benzyl-N-ethylamino)-benzoyl]-1-phenylimidazole, bis(5-hydroxy-3-methyl-1-phenylpyrazol-5-yl) ketone, 3-methyl-1-(2-amino phenyl)-5-(4-dimethylaminobenzoyl)pyrazole, 1-phenyl-3-(4-dimethylaminobenzoyl)-benzpyrazole, 3-(2-amino benzoyl) pyridine, 2-(4-di-methylaminobenzoyl)quinoline, 2-benzoyl-4,6-dimethylpyrimidine, 3-benzoylpyrazine, 3-benzoylpyridazine, 2-benzoyl-s-triazine, 9-acridone, anthraquinone, anthrone, 9-H-thioxanthone-9-one-10-oxide, and 9-H-thioxanthone-9-one-10,10-dioxide. Of the polymeric dyes of the invention prepared from ketones having heterocyclic groups, those prepared from 9-acridone, 2-methyl-3-benzoylindole, and 3-methyl-1-phenyl-5(4-dimethylaminobenzoyl)-pyrazole are preferred.

The reaction in accordance with Equation I is performed in the presence of a condensation catalyst to accelerate the reaction. Preferably, the condensation catalyst is phosphorous oxychloride. The condensation is performed by heating a mixture of one mole of diaryl ketone per repeating unit of arylamino polymer (Formula II) at a temperature of 50° to 150° C. for one to twelve hours under an inert atmosphere. Generally, the reaction is carried out under atmospheric pressure; however, reduced pressure or superatmospheric pressure of up to 5 or more atmospheres can be used. It is also preferable that the reaction be carried out in an inert solvent, e.g., halogenated hydrocarbons such as chloroform and chlorobenzene or mixtures thereof. Generally, from about 1 part to 50 parts by weight of solvent per part by weight of combined diaryl ketone and arylamino polymer is used. From about 0.1 part to 1.0 parts of condensation catalyst is used per part by weight of combined diaryl ketone and arylamino polymer. Following the heating period, the reaction mixture is dispersed in a non-solvent such as acetone or heptane, filtered and vacuum dried.

The polymeric dyes of the invention are partly soluble in the halogenated hydrocarbons such as chloroform, chlorobenzene and dichlorobenzene and cyclic ethers such as tetrahydrofuran. The dyes are highly soluble in polar organic solvents such as dimethyl formamide and N-methylpyrrolidone. The polymeric dyes of the invention are highly colored and for this reason can be incorporated into resins in amount ranging from less than about 0.001 to more than 10 percent by weight depending on the intensity of color desired in the resin. Resins into which the dyes can be incorporated include vinyl resins such as polyvinyl chloride, polyvinylidenechloride; acrylic resins, such as polymethyl methacrylate; phenolic resins such as the phenol-formaldehyde resole and novolak resins; and the epoxy resins. The dye-resin compositions can be used in ink formulations, colored films and foils for color filters, and decorative purposes. Because of their polymeric character, the dyes are non-migrating.

The following examples further illustrate the nature and method of preparation, and the objects and advantages of the polymeric dyes of the invention. The particular materials and amounts thereof recited in these examples, as well as other conditions and details, should not be construed to unduly limit this invention. All proportions are by weight and all temperatures are in degrees centigrade unless otherwise noted.

EXAMPLE 1

Preparation of an Arylamino Polyester

A solution of 1.95 parts of N,N-di(2-hydroxyethyl)-3-methylaniline (Eastman), recrystallized from a mixture of benzene and hexane, and 2.03 parts of terephthaloyl chloride (Aldrich Chemical Co.) in 60 parts of 1,2-dichloroethane was heated to 70° while stirring under a flow of nitrogen. There was then added 3 parts of pyridine to the reaction mixture and the temperature maintained at 70° to 80° for 4 hours. The reaction mixture was then poured in a thin stream into 315 parts of methanol and the precipitate which formed was filtered, dissolved in chloroform, and reprecipitated in methanol. The precipitated polymer was again filtered and dried, yielding 3.0 parts (92% theory) of product having a molecular weight of about 5000 and infrared and NMR spectra corresponding to the arylamino polyester having repeating units of the formula

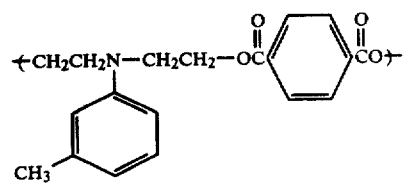

EXAMPLE 2

Preparation of an Amino Triarylmethane Dye of the Invention

A solution of 0.81 parts of the arylamino polyester, prepared in Example 1, 0.56 parts of 4-dimethylaminobenzophenone, and 0.75 parts of phosphorous oxychloride in 40 parts of 2:1 chloroform:chlorobenzene was heated to reflux under a flow of nitrogen for 5 hours. The solvents were then removed by evaporation and the residue taken up in about 40 parts of N-methylpyrrolidone and poured in a thin stream into about 100 parts of acetone. The precipitate obtained, was filtered and dried under vacuum, yielding 0.65 parts of deep green polymer that was insoluble in acetone and heptane, partially soluble in chloroform and tetrahydrofuran but highly soluble in dimethyl formamide and N-methylpyrrolidone.

EXAMPLE 3-8

TABLE I lists additional arylamino polyesters and a polyurethane that was prepared and gives the initiating dialkanolarylamine, diacid source, and reaction medium used for each.

TABLE I

| Ex. No. | Dialkanol-arylamine | Diacid source | Reaction medium | Arylamino Polymer |
|---|---|---|---|---|
| 3 | a | e | i | 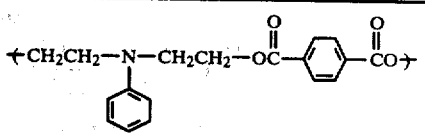 |
| 4* | b | f | j | 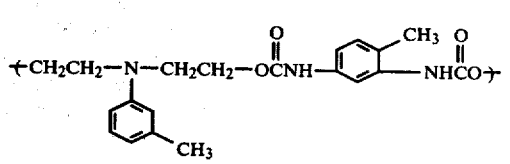 |
| 5 | a | g | i | 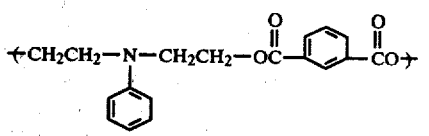 |
| 6 | a | h | i | 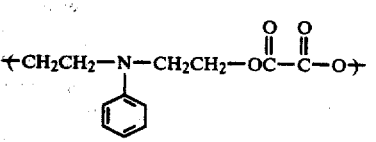 |
| 7 | a + c | e | i | 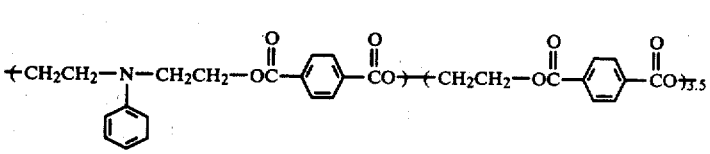 |
| 8 | a + d | e | i | 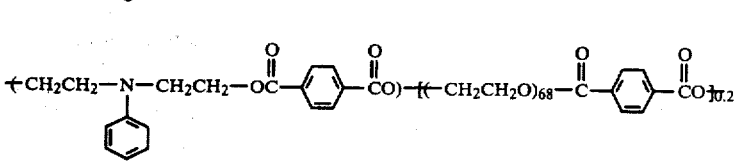 | a = N,N—di(2-hydroxyethyl)aniline
b = N,N—di(2-hydroxyethyl)-3-methylaniline
c = ethylene glycol
d = polyoxyethylene glycol, m.w. of 3000
e = terephthaloyl chloride
f = 2,4-toluene diisocyanate
g = isophthaloyl chloride
h = oxalyl chloride
i = 1,2-ethylene dichloride plus two molar equivalents of pyridine
j = ethylacetate plus dibutyltin dilaurate as reaction catalyst
* = an arylamino urethane polymer

EXAMPLES 9-18

Using arylamino polyesters and polyurethanes prepared as described in Example 1 and 3-8, triarylmethane dyes were prepared in accordance with Example 2 using the diarylketones listed in TABLE II.

TABLE II
| Ex. No. | Arylamino Polyester | Diaryl Ketone | Triarylmethane Dye | Color |
|---|---|---|---|---|
| 9 | Ex. 1 | k | 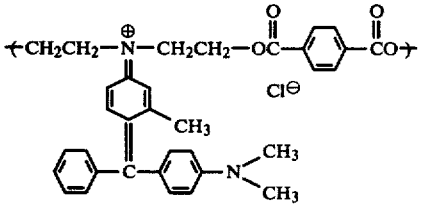 | Green |
| 10 | Ex. 1 | l | | Blue |
| 11 | Ex. 3 | k | | Green |
| 12** | Ex. 4 | k | 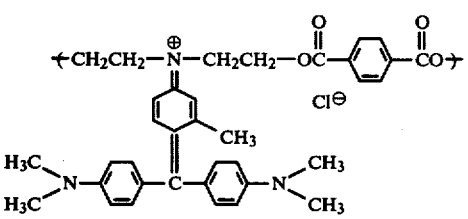 | Green |
| 13** | Ex. 4 | l | 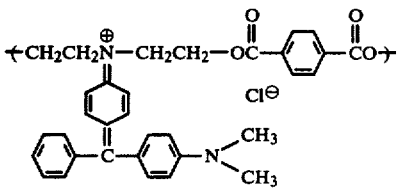 | Blue |
| 14 | Ex. 5 | l | 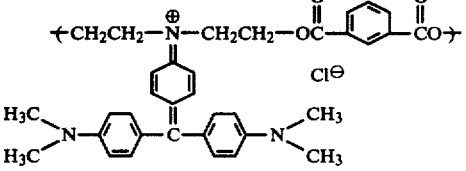 | Blue |
| 15 | Ex. 6 | l | 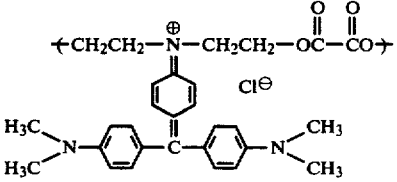 | Blue |

TABLE II-continued

| Ex. No. | Arylamino Polyester | Diaryl Ketone | Triarylmethane Dye | Color |
|---|---|---|---|---|
| 16 | Ex. 7 | m | | Green |
| 17 | Ex. 7 | n | | Purple |
| 18 | Ex. 7 | p | | Purple | k = 4-dimethylaminobenzophenone
l = bis-(4-dimethylaminophenyl)ketone
m = benzophenone
n = biphenyl phenyl ketone
p = 9-acridone
** = polyurethane backbone

EXAMPLE 19

Poly(N-phenylethyleneimine) was prepared by the polymerization of N-phenylethyleneimine in dry acetonitrile using formic acid as catalyst in accordance with the procedure described by Kagiya et al. (Bull. Chem. Soc. Japan, 41, 2473(1968)). One part by weight of the poly(N-phenylethyleneimine) was mixed with 1.89 parts (an equivalent amount) of 4-dimethylaminobenzophenone in 30 parts of phosphorous oxychloride and the mixture heated at 60° for two hours. The mixture was then cooled and poured into about 100 parts of water and filtered. There was obtained 2.8 parts of a dark green polymeric product that was insoluble in most solvents and had unis of the structure:

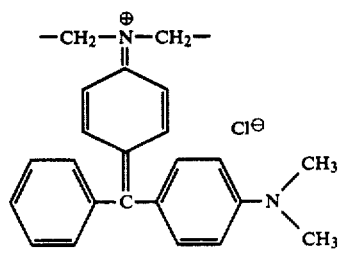

EXAMPLE 20

The procedure of Example 19 was repeated with the exception that an equivalent amount of 4,4'-bis(dimethylamino)benzophenone was used in place of the 4-dimethylaminobenzophenone. There was obtained a deep blue polymeric product having units of the structure:

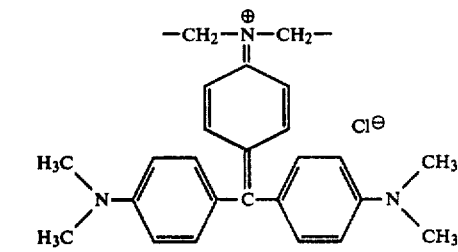

EXAMPLE 21

Example 2 was repeated except that the arylamine polyester of Example 1 was replaced by an equivalent amount of the copolymer described in Example 8. There was obtained a light green polymer soluble in tetra-hydrofuran having the structure:

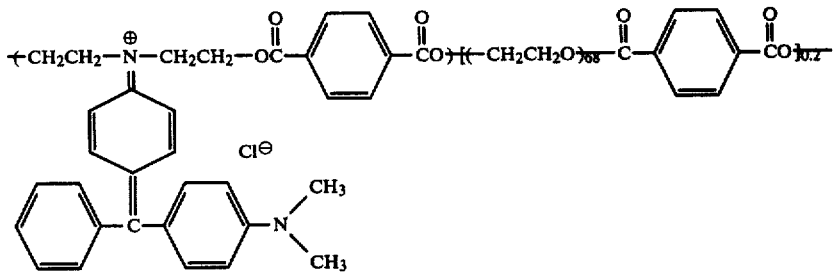

EXAMPLE 22

One hundred parts of a 71/29 ethylene: vinyl acetate copolymer (A-C® Polyethylene 430, Allied Chemical Co.) was heated to 70° C. and a solution of 0.5 parts of the polymeric dye of Example 2 in 25 parts of dimethyl formamide was added. After stirring at 70° C. for a few minutes, a green colored melt was obtained that was poured into a tray and the solvent removed under reduced pressure. A tough green solid having a waxy surface was obtained. Soxlet extraction of a finely ground portion of the solid with methanol did not remove the dye.

In a similar manner, trials of other polymeric dyes of the invention were run and the dyes could not be extracted from ethylene-vinyl acetate copolymers into which the polymeric dye had been incorporated.

EXAMPLE 23

One hundred parts of polystyrene (Dow Chemical Corp.) was dissolved in 500 parts of tetrahydrofuran and 10 parts of the polymeric dye of Example 11 added. The mixture was stirred and heated to 50° C. for a few minutes to disperse the dye. The solution was spread in an aluminum tray and the solvent removed in a vacuum oven. Bright green brittle film was obtained. Portions of the film were ground and Soxlet extracted with methanol. No dye was removed from the polystyrene.

Similar results were obtained when other polymeric dyes were used in place of the dye of Example 11.

EXAMPLE 24

To a solution of 10 parts of polymethyl methacrylate (DuPont Elvacite® 2010) in 100 parts of methyl ethyl ketone was added 0.1 part of the polymeric dye of Example 9 in 2 parts of dimethyl formamide. The mixture was heated to 70° C. while stirring and then spread in an aluminum tray. The solvents were then removed in a vacuum oven. There was obtained a tough deep blue layer that could be removed from the tray as a self-supporting film. No dye could be removed from the polymethyl methacrylate by extraction with methanol.

Similar results were obtained when other polymeric dyes were used in place of the dye of Example 9.

EXAMPLE 25

When Examples 22-24 were repeated using in place of the polymeric dyes of the invention a monomeric triarylmethane dye such as Crystal Violet or Malachite Green, the monomeric dye was essentially completely extracted from the ground polymer containing it.

EXAMPLE 26

Strips of cotton cloth were soaked in a 4 percent solution of the polymeric dye of Example 15 in dimethyl formamide for 2 minutes at 20° C. and then dried in a vacuum oven at 60° C. The optical density of the dried cloth was 1.4 by reflectance and 1.08 by transmission. The strips were washed in methanol, soap and water, and again in methanol. After drying, the strips had an optical density of 0.95 by reflection and 0.74 by transmission corresponding to an optical density retention on washing of about 68 percent.

When the procedure was repeated using Crystal Violet in place of the polymeric dye an optical density retention on washing of 23 percent was obtained.

EXAMPLE 27

Example 26 was repeated using nonwoven polyester fiber in place of cotton. Optical density by reflection was found to be 95 to 100% retained following washing three times with methanol, once with soap and water, and again with methanol.

When the procedure was repeated using Crystal Violet in place of the polymeric dye an optical density retention on washing of only 65% was obtained.

Various modifications and alterations of this invention will become apparent to those skilled in the art without departing from the scope and spirit of this invention, and it should be understood that this invention is not to be unduly limited to the illustrative embodiment set forth herein.

I claim:

1. A polymeric aminotriarylmethane dye having a polyester, polycarbonate, polyethyleneimine or polyurethane backbone, said dye comprising repeating units selected from the group consisting of

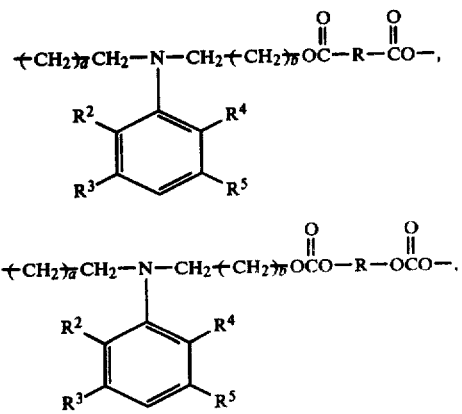

-continued

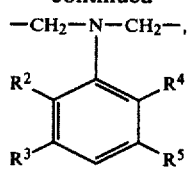

and

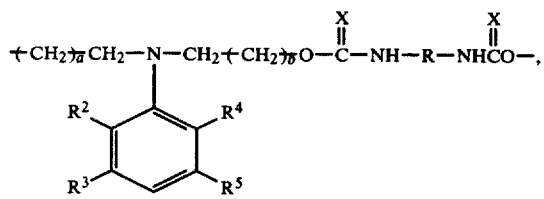

wherein R, R², R³, R⁴, R⁵, X, a, and b are as defined below, and said dye having at least one arylamino unit of the general formula:

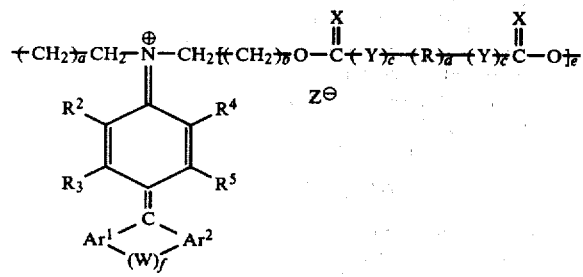

wherein
- a and b are independently zero or an integer of 1 to 3;
- X is oxygen or sulfur;
- Y is oxygen or —NH—;
- R is a divalent organic group selected from (1) aliphatic groups having 2 to 12 carbon atoms and up to 2 non-contiguous catenary groups selected from —O—, —S—, and —NR¹—, in which R¹ is a lower alkyl group having one to four carbon atoms, (2) cycloaliphatic groups having 5–12 carbon atoms, and (3) arylene groups having 6 to 12 carbon atoms;
- c, d, and e are independently zero or one, with the provisos that when e is zero, then a is zero, and when c is zero or Y is oxygen, then X is oxygen;
- R², R³, R⁴, and R⁵ are independently hydrogen, and auxochromic group, a bathochromic group or R² and R³ or R⁴ and R⁵ together are a benzo group;
- Ar¹ and Ar² are independently aromatic groups having one or two 5- or 6-atom rings with conjugated unsaturation, the 5-atom rings having four carbon atoms and one of oxygen, sulfur, or nitrogen or three carbon atoms, one nitrogen, and one of oxygen or sulfur in the 1,3-position or nitrogen in the 1,2- or 1,3-position, the 6-atom rings having six carbon atoms or five carbon atoms and one nitrogen, or four carbon atoms and two nitrogens in the 1,2-1,3-, or 1,4-position or three carbon atoms and three nitrogens in the 1,3,5-position; and
- W is a divalent group selected from the group consisting of a coordinate bond, —O—, —S—,

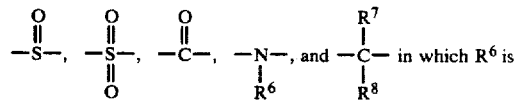

hydrogen or lower alkyl group having one to four atoms and R⁷ and R⁸ are independently hydrogen or a lower alkyl group having one to four carbon atoms;
- f is zero or one; and
- Z⊖ is an anion.

2. A polymeric or copolymeric aminotriarylmethane dye having a polyester, polycarbonate, or polyurethane backbone, said dye comprising repeating units selected from the group consisting of

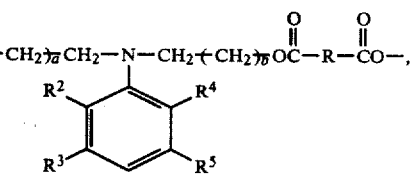

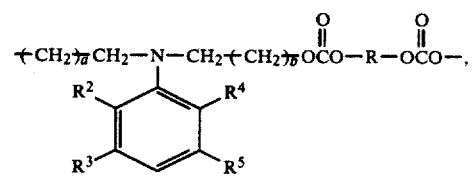

and

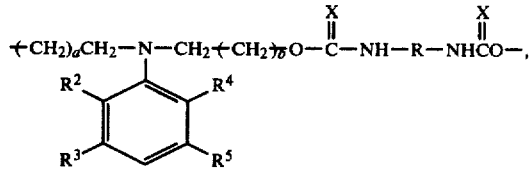

wherein R, R², R³, R⁴, R⁵, X, a, and b are as defined below, and said dye having 0.1 to 100 mol percent of arylamino units of the general formula:

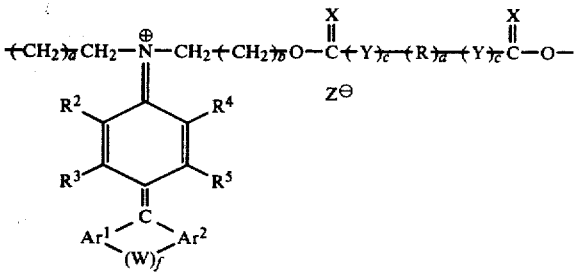

wherein
- a and b are independently zero or an integer of 1 to 3;
- X is oxygen or sulfur;
- Y is oxygen or —NH—;
- R is a divalent organic group selected from (1) aliphatic groups having 2 to 12 carbon atoms and up to 2 non-contiguous catenary groups selected from —O—, —S—, and —NR¹—, in which R¹ is a lower alkyl group having one to four carbon atoms, (2) cycloaliphatic groups having 5 to 12 carbon atoms, and (3) arylene groups having 6 to 12 carbon atoms;

c and d are independently zero or one, with the proviso that when c is zero or Y is oxygen, then X is oxygen;

$R^2$, $R^3$, $R^4$, and $R^5$ are independently hydrogen, an auxochromic group, a bathochromic group or $R^2$ and $R^3$ or $R^4$ and $R^5$ together are a benzo group;

$Ar^1$ and $Ar^2$ are independently aromatic groups having one or two 5- or 6-atom rings with conjugated unsaturation, the 5-atom rings having four carbon atoms and one of oxygen, sulfur, or nitrogen or three carbon atoms, one nitrogen, and one of oxygen or sulfur in the 1,3-position or nitrogen in the 1,2- or 1,3-position, the 6-atom rings having six carbon atoms or five carbon atoms and one nitrogen, or four carbon atoms and two nitrogens in the 1,2-1,3-, or 1,4-position or three carbon atoms and three nitrogens in the 1,3,5-position; and W is a divalent group selected from the group consisting of a coordinate bond, —O—, —S—,

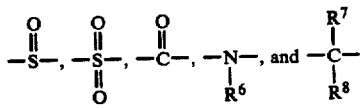

in which $R^6$ is hydrogen or lower alkyl group having one to four atoms and $R^7$ and $R^8$ are independently hydrogen or a lower alkyl group having one to four carbon atoms;

f is zero or one;

$Z^{\ominus}$ is an anion, and 99.9 to 0.0 mol percent of units of a non-arylamino unit-containing polyester or polyurethane having the general formula:

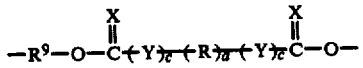

in which $R^9$ is an alkylene group having 2 to 12 carbon atoms or polyoxyethylene, polyoxypropylene or polyoxybutylene having a molecular weight up to 3000 and X, Y, R, c, and d are the same as defined above.

3. The polymeric dye according to claim 1 wherein R contains one catenary —O—, —S—, or

group.

4. The polymeric dye according to claim 1 wherein when $R^2$ and $R^3$ or $R^4$ and $R^5$ is a benzo group which is substituted by auxochromic or bathochromic groups.

5. The polymeric dye according to claim 1 wherein $Ar^1$ and $Ar^2$ are substituted by at least one auxochromic or bathochromic group.

6. The polymeric dye according to claim 1 having at least one unit of the general formula:

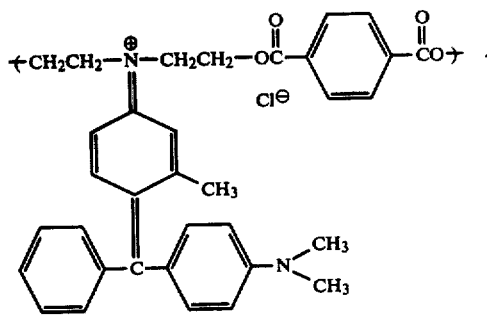

7. The polymeric dye according to claim 1 having at least one unit of the general formula:

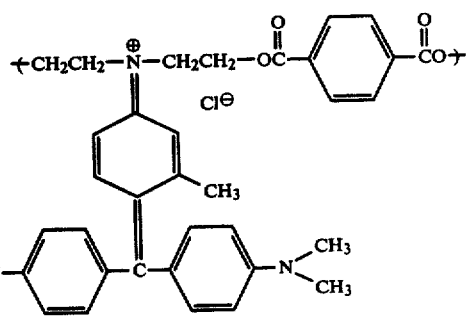

8. The polymeric dye according to claim 1 having at least one unit of the general formula:

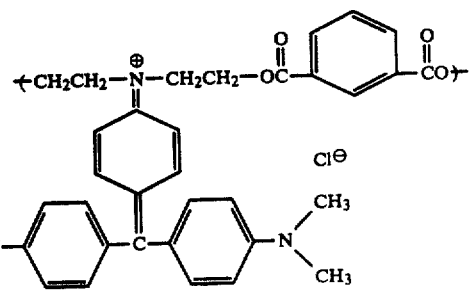

9. The polymeric dye according to claim 1 having at least one unit of the general formula:

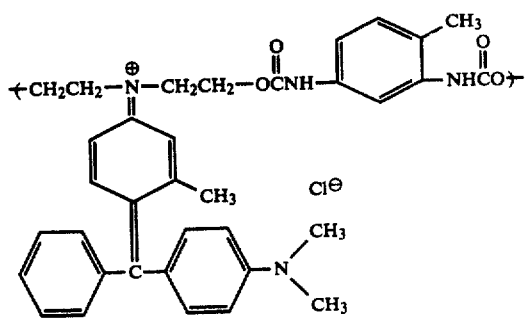

10. The polymeric dye according to claim 1 having at least one unit of the general formula:

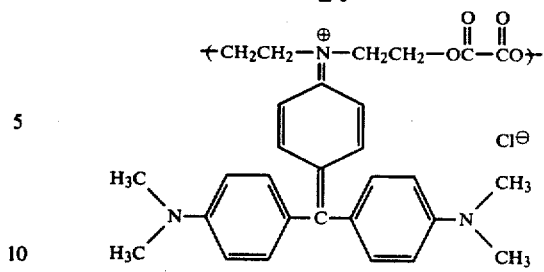

11. The polymeric dye according to claim 2 having at least one unit of the general formula:

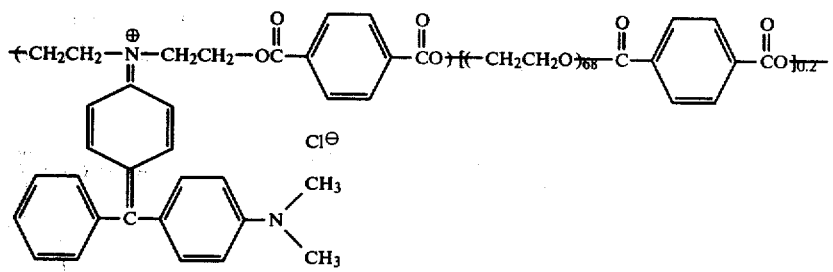

12. The polymeric dye according to claim 2 having at least one unit of the general formula:

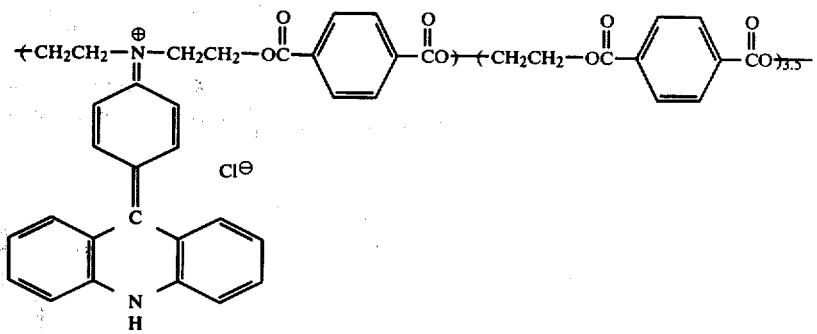

13. Resins comprising in the range of 0.001 to 10 weight percent of the polymeric dye according to claim 1.

14. The polymeric aminotriarylmethane dye according to claim 1 wherein f is zero and $Ar^1$ and $Ar^2$ are 6-atom aromatic rings containing only carbon atoms.

* * * * *